J. S. THIELL.
VEHICLE SPRING.
APPLICATION FILED AUG. 12, 1910.
1,016,905.
Patented Feb. 6, 1912.
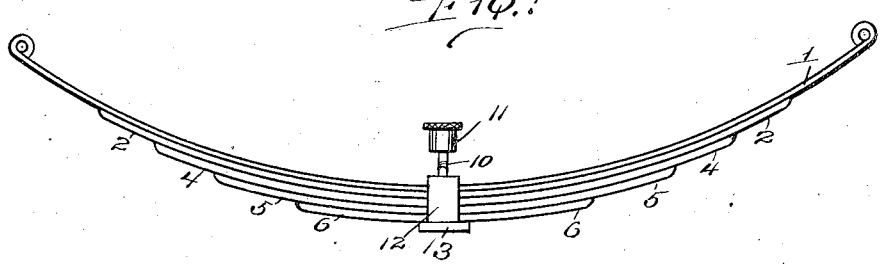
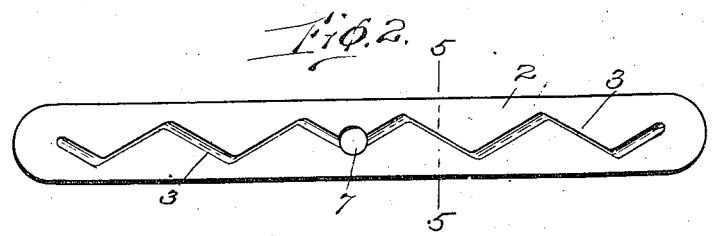
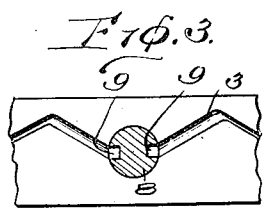
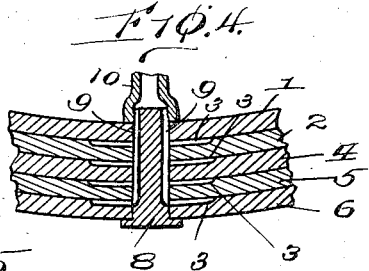
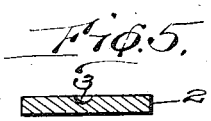
Inventor
John S. Thiell
Witnesses

UNITED STATES PATENT OFFICE.

JOHN S. THIELL, OF ST. LOUIS, MISSOURI.

VEHICLE-SPRING.

1,016,905.  Specification of Letters Patent.  Patented Feb. 6, 1912.

Application filed August 12, 1910. Serial No. 576,825.

*To all whom it may concern:*

Be it known that I, JOHN S. THIELL, a citizen of the United States, residing at St. Louis, State of Missouri, have invented certain new and useful Improvements in Vehicle-Springs, of which the following is a specification.

This invention relates to vehicle springs, and means for lubricating the same, and one of the principal objects of the invention is to provide a vehicle spring of the elliptical type having means whereby a quantity of oil can be fed between the various layers of the spring to prevent creaking and to extend the life of the spring.

Another object of the invention is to provide an elliptical spring made up of various leaves or layers, each having zig-zag grooves in the face thereof, and means for feeding oil to said grooves so that the movement of one layer upon the other will be lubricated to prevent creaking and to insure a smooth and easy action of the spring.

These and other objects may be attained by means of the construction illustrated in the accompanying drawing, in which, Figure 1 is a side elevation of one member of the elliptical spring made in accordance with my invention. Fig. 2 is a top plan view of one of the leaves or layers of the spring. Fig. 3 is a detail plan view of a portion of the spring and a sectional view of the connecting bolt. Fig. 4 is a vertical section of a portion of the center of the spring connected by the bolt, the clip shown in Fig. 1 being omitted. Fig. 5 is a sectional view on the line 5—5 of Fig. 2.

Referring to the drawing the numeral 1 designates the main leaf or layer of the spring, which may be of the usual or any suitable type. The next leaf or layer 2 is provided upon its upper surface with a zig-zag groove 3 extending longitudinally of the leaf and terminating at points near the outer ends of said leaf. The other layers or leaves 4, 5 and 6 are also provided with zig-zag grooves substantially identical with that shown in Fig. 2 upon the upper surfaces thereof, as at 3. Each of the leaves or layers of the spring is provided with a central aperture 7 to receive a bolt or pin 8 provided with grooves 9 at opposite sides thereof, said bolt extending through the apertures 7 in all of the leaves of the spring and having connected to the threaded upper end thereof a feed tube 10 which leads to an oil cup or container 11 for a lubricating material. Connected to the bolt 8 is a clip 12 which extends around and incloses all the leaves of the spring, said clip being provided with a cross bar 13, as shown more particularly in Fig. 1.

From the foregoing it will be obvious that a suitable lubricant fed through the tube 10 into the grooves 9 at opposite sides of the bolt 8 will pass into the zig-zag grooves 3 to lubricate the various leaves of the spring on their surface and to prevent creaking and insure smoothness of action, which will add materially to the length of life of the spring. The grooves 3 may be formed in the leaves of the spring by means of rollers or other suitable mechanism. Leaf springs of any type may be provided with my lubricating device and any number of leaves may be used. As shown in the drawing portions of the grooves 3 are narrower than the next adjacent portions, to prevent the oil from running back after it has been fed from the oil cup.

I claim:

A vehicle spring comprising a series of leaves, said leaves having a zigzag groove in the upper faces thereof, a centrally disposed bolt extending through all the leaves for connecting the same together, said bolt having grooves in the opposite sides of the shank portion thereof, said grooves communicating with the zigzag grooves in the leaves of the spring, and a lubricator cup connected to the end of said bolt for feeding oil through the grooves in the shank of the bolt and to the zigzag grooves, essentially as described.

In testimony whereof I affix my signature in presence of two witnesses.

JOHN S. THIELL.

Witnesses:
 T. V. DAVIES,
 H. H. WALKER.